United States Patent [19]

Wheeler

[11] 4,048,720
[45] Sept. 20, 1977

[54] CHAIN SAW GUIDE APPARATUS

[76] Inventor: Charles J. Wheeler, 2346 Haines, Madison, Ohio 44057

[21] Appl. No.: 671,281

[22] Filed: Mar. 29, 1976

[51] Int. Cl.$^2$ .............................................. B27B 17/02
[52] U.S. Cl. .................................... 30/166 A; 30/372; 83/745; 144/73
[58] Field of Search .................... 30/166 A, 371, 372, 30/373, 378, 381, 386; 144/2 N, 72, 73; 83/745

[56] References Cited

U.S. PATENT DOCUMENTS

| 739,496 | 9/1903 | Kidder | 30/166 A |
| 2,463,860 | 3/1949 | Foster | 83/745 X |
| 2,974,694 | 3/1961 | Mattila | 83/745 X |

FOREIGN PATENT DOCUMENTS

| 521,391 | 3/1931 | Germany | 144/73 |
| 524,660 | 5/1931 | Germany | 144/73 |
| 322,333 | 12/1929 | United Kingdom | 144/73 |

Primary Examiner—Jimmy C. Peters

[57] ABSTRACT

A guide apparatus is provided for guiding movement of a chain saw in a direction parallel to the longitudinal axis of the bar of the saw through a member in which it is desired to cut an opening with the chain saw. The guide apparatus includes a guide member disposed contiguous to the member to be cut. The guide member has a guide surface thereon which is disposed parallel to the axis of an opening to be cut in the member and parallel to the longitudinal axis of the chain saw. A guide means is provided for engaging the guide surface and guiding relative movement between the guide surface and the guide means in a direction parallel to the longitudinal axis of the bar of the saw. The guide means is supported by a support member which is attached to the chain saw to enable the guide means to guide movement of the chain saw as the guide means moves along the guide surface to enable the chain saw to move in a direction parallel to the axis of the bar to thereby penetrate the member to be cut to establish an opening therein having an axis parallel to and co-extensive with the longitudinal axis of the bar of the saw.

16 Claims, 4 Drawing Figures

CHAIN SAW GUIDE APPARATUS

BACKGROUND OF THE PRESENT INVENTION

The present invention relates to an apparatus for guiding movement of a chain saw in a direction substantially parallel to the longitudinal axis of the bar of the saw to enable the saw to cut an opening in a member wherein the opening has an axis substantially parallel to the bar of the saw. More specifically, the present invention contemplates a guide apparatus for guiding movement of a chain saw through a post member in a direction substantially parallel to the longitudinal axis of the bar of the saw to establish an elongate opening in the post disposed substantially perpendicular to the longitudinal axis of the post and having a cross-sectional configuration roughly equivalent to the cross-sectional configuration of the bar of the saw taken perpendicular to the longitudinal axis of the bar of the saw.

Known methods and apparatus for creating elongate openings in a post member generally consist of drilling a plurality of adjacent openings in the post and then utilizing a chisel to convert the plurality of holes into a single elongate opening having an axis substantially perpendicular to the longitudinal axis of the post. Such an operation has been previously utilized in assembling split rail fencing wherein the fence post has elongate openings therein to receive the ends of the split rails to thereby support the split rails in the desired position. Since split rail fences are assembled on the job due to varing topographical conditions, each opening of the fence post must be individually located as conditions dictate at the site. With standard size fencing, usually three contiguous aligned holes are drilled in the post and then a chisel is used to join the three holes to create a single elongate openings for receiving the end of a split rail therein. Such a method of construction is both cumbersome and time consuming. Accordingly the present invention contemplates a saving of a substantial labor costs by providing a guide apparatus to guide the movement of a chain saw in a direction parallel to the elongate axis of the bar of the saw through a post to cut an opening therein for supporting the end of a split rail.

SUMMARY OF THE PRESENT INVENTION

The present invention provides a new and novel guide apparatus for guiding movement of a chain saw in a direction substantially parallel to the longitudinal axis of the bar of the saw through a member disposed contiguous to the guide apparatus. The guide apparatus includes a guide member disposable contiguous to a member to be cut and having a guide surface thereon disposable substantially parallel to the axis of a hole to be cut in the member of the chain saw. Guide means are provided for engaging the guide surface on the guide member. The guide means are movable along the guide surface relative to the guide member in a direction substantially parallel to the longitudinal axis of the bar of the chain saw. A support means, supported by the saw, is provided for supporting the guide means in engagement with the guide surface of the guide member to enable the guide member to guide movement of the chain saw in a direction substantially parallel to the bar of the saw to enable the chain saw to cut an opening in a member disposed contiguous to the guide member wherein the opening has an axis substantially parallel to the longitudinal axis of the bar of the chain saw.

The present invention further provides a guide apparatus for guiding movement of a chain saw in a direction substantially parallel to the longitudinal axis of the bar of the saw through a member in which it is desired to cut an opening. The guide apparatus includes a guide means supportable by the saw for guiding movement of the saw in a direction substantially parallel to the longitudinal axis of the bar of the saw and a guide member disposable contiguous to a member to be cut and having a guide surface thereon. The guide means engages the guide surface of the guide member to guide movement of the saw relative to the guide member in a direction substantially parallel to the longitudinal axis of the guide surface and substantially parallel to the longitudinal axis of a hole to be cut in the member.

DESCRIPTION OF THE PREFERRED EMBODIMENT

Figure 1:
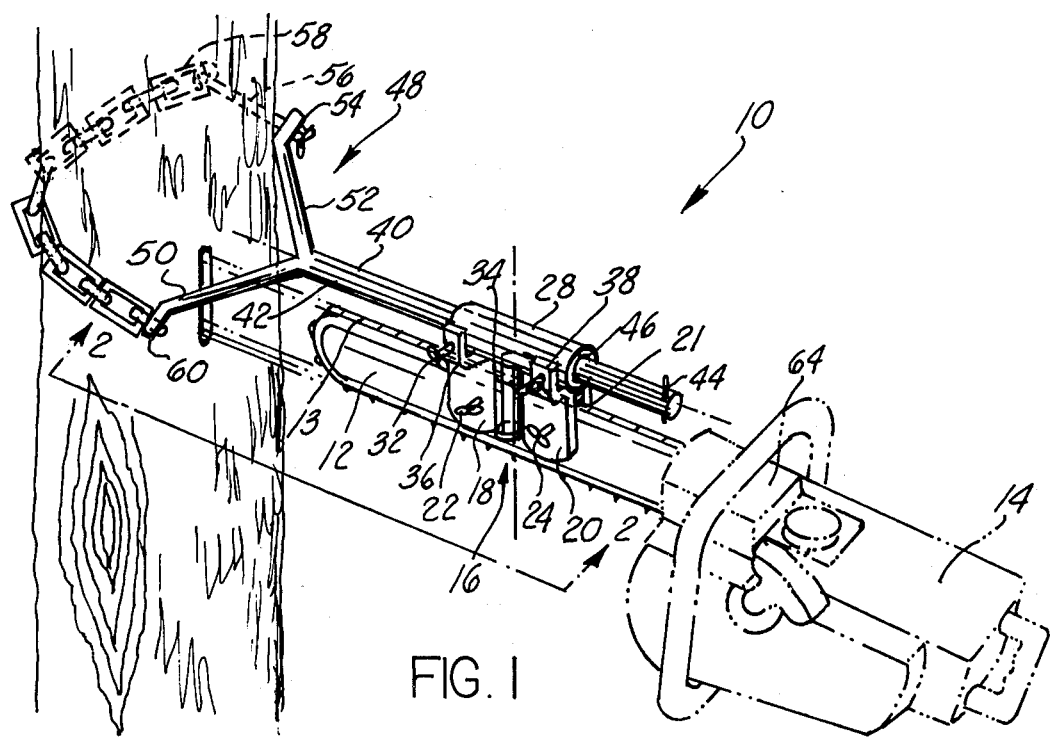
FIG. 1 is a perspective view of the present guide apparatus showing its position on a saw and engaging with a member through which it is desired to cut an opening.
Figure 2:
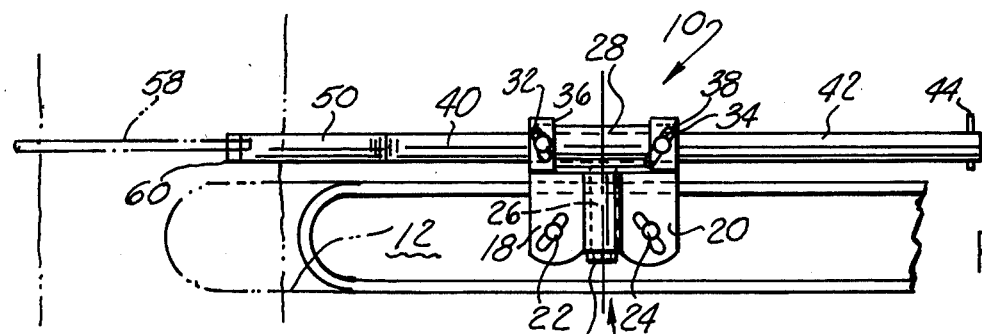
FIG. 2 is a side view of the guide apparatus taken approximately along the lines 2—2 of FIG. 1.

Referring to the figures and more particularily to FIGS. 1 and 2 the guide apparatus 10 is adapted to be secured to the bar 12 of a chain saw 14. To this end the guide apparatus 10 includes a support structure 16 which is adapted to be secured to the bar 12 of the chain saw 14 to support the guide apparatus 10. The support means 12 includes a pair of support members 18 and 20 which are interconnected and which are adapted to be affixed to the bar 12 of the chain saw 14. A bolt member 22 is located in a suitable threaded opening disposed in the support member 18 and a bolt member 24 is disposed in a suitable threaded opening disposed in the support member 20. When the bar 12 of the chain saw is disposed in the channel 21 provided in the members 18 and 20 the bolts 22 and 24 can be tightened to engage with the planer surface of the bar 12 to thereby affix the support members 18 and 20 rigidly to the bar 12. It can be seen that when the support members 18 and 20 are affixed to the bar 12 of the chain saw a sufficient clearance is maintained within the channel 21 disposed in the support members 18 and 20 to allow the chain 13 to move about the periphery of the bar 12 unhindered.

A tubular member 26 is affixed to the support members 18 and 20 and supports a guide means in the form of a guide tube 28. Affixed to the guide tube is a pivot rod 30 which is disposed substantially perpendicular to the guide tube 28 and attached at a mid-portion thereof. The pivot member 30 is received within the tubular member 26 which supports the pivot member 30 and the guide tube 28 for rotation relative to the longitudinal axis of the pivot member 30. This enables the guide tube 28 to be rotated relative to the support means 16 as will be disclosed more fully herein below.

Figure 3:
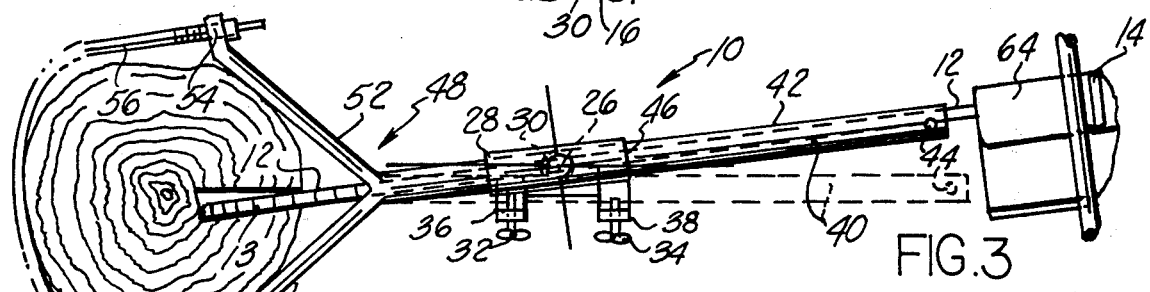
FIG. 3 is a top view of the guide apparatus showing the saw rotated to its furthermost counterclockwise position relative to the stop members.
Figure 4:
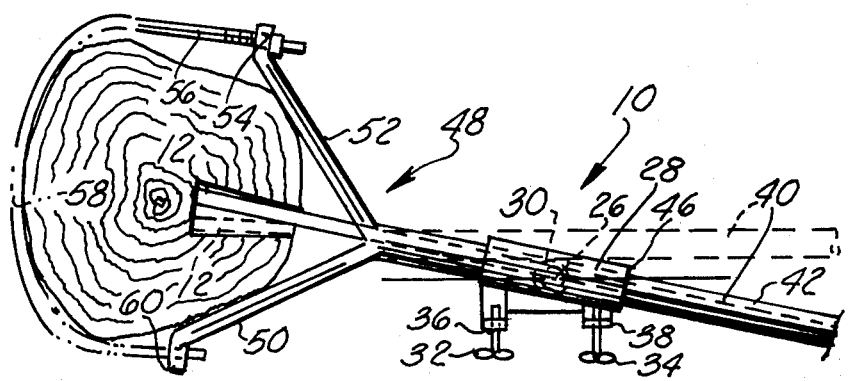
FIG. 4 is a top view similar to FIG. 3 except illustrating the guide apparatus as the saw is rotated in a clockwise direction to engage with the stop member.

A pair of stop members 32 and 34 are disposed in tabs 36 and 38 which are supported by the support members 18 and 20 respectively to limit the rotation of the guide tube 28 about the longitudinal axis of the pivot rod 30. As is more fully disclosed in FIGS. 3 and 4, the stop members 32 and 34 are adjustable relative to the support means 16 to limit the rotational movement of the guide tube 28 about the axis of rotation of the pivot member 30. To this end the stop member 32 operates to limit rotation of the guide tube 28 in a counterclockwise direction as viewed in FIG. 3 by engaging an end surface of the stop member 32 with the outer surface of the guide tube 28 to thereby limit rotation of the guide tube 28. The stop member 34 is operable to limit the clockwise movement of the guide tube 28 about the axis of rotation of the pivot member 30 as viewed in FIG. 4 by engaging an end surface of the stop member 34 with the outer surface of the guide tube 28. Both the stop members 32 and 34 are adjustable relative to their supporting tabs 36 and 38 to vary the permitted pivotable movement of the guide tube 28 about the axis of rotation of the pivot member 30.

A guide member 40 having an outer guide surface 42 is supported for longitudinal movement relative to the guide tube 28. A stop member 44 is provided at one end of the guide member 40 to limit its longitudinal movement toward the left relative to the support means 16 as viewed in FIG. 2. The stop member is operable to engage with the end surface 46 of the guide tube 28 to thereby limit movement of the guide member 40.

Disposed at the opposite end of the guide member 40 is a post engaging means 48 which is operable to support the guide member 40 in a position contiguous to a post to be cut and wherein the longitudinal axis of the guide member 40 is disposed substantially parallel to the axis of a hole desired to be cut in the post member. The post engaging means 48 includes a pair of members 50 and 52 which form a v-shaped bracket for receiving the post therebetween as is more fully illustrated in FIGS. 3 and 4. The member 52 includes an opening 54 therein for receiving the bolt member 56. The bolt member 56 includes a flexible chain 58 attached thereto which is operable to extend around the post and engage with a chain hook 60 disposed on one end of the member 50.

When it is desired to affix the guide member 40 to a post member the post member is disposed between the v-shaped bracket formed by the members 50 and 52. The chain 58 is then looped around the post member and tightly engaged with the chain hook 60 on the member 50 to thereby dispose the members 50 and 52 in a contiguous relationship with the post member. When the chain member 58 is tightly engaged with the post, the guide member 40 will be disposed in a position substantially parallel to the longitudinal axis of the bar 12 of the chain saw and in a position substantially parallel to the desired axis of an opening desired to be cut in the post member.

The post engaging means 48 supports the guide member 40 in a position to allow the guide tube 28 to move along the guide surface 42. This will enable the bar 12 of the saw 14 to move parallel to the guide member 40 and cut an opening in the fence post having a cross-sectional configuration roughly equivalent to that of the cross-sectional configuration of the bar 12 when taken substantially perpendicular to the longitudinal axis of the bar 12. If it is desired to provide an opening in the post 12 having a width greater than the cross-sectional configuration of the bar 12 of the chain saw 14, the stop members 32 and 34 can be adjusted to allow the bar of the chain saw 12 to rotate about the pivot member 30 in a clockwise and counterclockwise direction as viewed in FIGS. 3 and 4. If the chain saw is alternately rocked in a clockwise and counterclockwise direction until the stop members 32 and 34 engage the outer surface of the guide tube 28, a controlled width greater than the width of the bar 12, can be developed in the opening cut in the post member. It should also be appreciated that while vertical rotation of the guide tube 28 relative to the support means 16 is not disclosed, such vertical rotation could easily be provided with stop members similar to the stop members 32 and 34 to control the vertical rotation of the guide tube 28 relative to the support means 16 to establish an opening having a height greater than that of the bar 12.

It should be appreciated that the present guide apparatus 10 enables the chain saw 14 to cut an opening disposed in the post member having an axis substantially perpendicular to the longitudinal axis of the post. Moreover, the guide apparatus 10 will support the chain saw 14 in a postion in which it is desired to cut the opening to thereby provide a precision means for guiding the chain saw 14 through the post at the exact position in which it is desired to cut the opening. While the support means 16 has been illustrated as being attached to the bar 12 of the chain saw 14 it should be apparent that suitable means could attach the guide apparatus 10 directly to the casing or the equivalent thereof on the chain saw 14. For example, a guideway, not illustrated, could be provided integral with the casing 64 of the chain saw 14 to guide movement of a guide member such as the guide member 40 relative thereto.

From the foregoing it should be apparent that a new and improved guide apparatus has been provided for guiding movement of a chain saw in a direction substantially parallel to the longitudinal axis of the bar of the chain saw through a post member in which it is desired to cut an opening. The guide apparatus includes a guide member disposable contiguous to the member to be cut and a guide tube for engaging the guide member and guiding movement of the chain saw in a direction parallel thereto. The guide tube is connected to the chain saw by a support means which affixes the relative disposition of the guide tube relative to the chain saw to enable the guide tube to guide movement of the chain saw in a direction parallel to the longitudinal axis of the bar of the chain saw and in a direction parallel to the axis of an opening desired to be cut in the member. Stop means are povided for limiting rotation of the chain saw relative to the guide member to expand the width of the desired opening to one greater than the cross-sectional configuration of the bar of the saw.

What I claim is:

1. A guide apparatus attachment for guiding movement of a portable hand-held chain saw having a bar having a chain guide surface extending around the edge thereof which defines a plane and a pair of planer parallel side surfaces disposed parallel to and one on each side of said plane in which the chain guide surface extends, the guide apparatus being adapted to guide movement of the chain saw in a direction substantially parallel to the longitudinal axis of the bar of the saw through a member disposed contiguous to the guide apparatus attachment comprising a guide member disposable contiguous to a member to be cut and having a guide surface thereon disposed substantially parallel to the axis of a hole to be cut in the member by the chain saw and substantially parallel to the longitudinal axis of the bar of the chain saw, said guide member and guide surface being disposed in the plane defined by the chain guide surface on the bar of the saw, guide means engaging said guide surface, said guide surface guiding relative movement of said guide member and said guide means in a direction substantially parallel to the longitudinal axis of the bar of the chain saw and support means rigidly supportable by the bar of the chain saw for supporting said guide means in engagement with said guide surface of said guide member to enable said guide member to guide movement of said guide means and the chain saw in a direction parallel to said guide surface to enable the chain saw to cut a hole in the member disposed contiguous to said guide member wherein the hole has an axis substantially parallel to the longitudinal axis of the bar of the chain saw and substantially parallel to said guide surface.

2. A guide apparatus for guiding movement of a chain saw as defined in claim 1 wherein said guide member is an elongate member having means disposed at one end thereof for affixing said elongate member contiguous to a member to be cut with the longitudinal axis of the elongate member disposed substantially parallel to the axis of the hole to be cut in the member by the chain saw.

3. A guide apparatus for guiding movement of a chain saw as defined in claim 2 wherein said means disposed at one end of said elongate member includes a v-shaped bracket having flexible means disposed between the ends of the v-shaped bracket for securing said v-shaped bracket and said elongate member to a member in which it is desired to cut a hole in a position in which said elongate member is disposed substantially parallel to the axis of a hole desired to be cut in the member.

4. A guide apparatus for guiding movement of a chain saw as defined in claim 1 wherein said guide means includes a tubular member having an inner surface which is adapted to engage with the guide surface of said guide member to enable said guide member to move relative to said tubular member only in a direction parallel to the longitudinal axis of the tubular member.

5. A guide apparatus attachment for guiding movement of a portable hand-held chain saw having a bar having a chain guide surface extending around the edge thereof which defines a plane and a pair of planer parallel side surfaces disposed parallel to and one on each side of the plane in which the chain guide surface extends, the guide apparatus being operable to guide movement of the chain saw in a direction substantially parallel to the longitudinal axis of the bar of the saw through a member in which it is desired to cut a hole comprising guide means rigidly supportable by the bar of the saw for guiding movement of the saw in a direction substantially parallel to the longitudinal axis of the bar of the saw, a guide member disposable contiguous to a member to be cut having a guide surface thereon having a longitudinal axis substantially parallel to the axis of the hole to be cut in the member, said guide member and guide surface being disposed in the plane defined by the chain guide surface on the bar of the saw, said guide means engaging said guide surface of said guide member to guide movement of the saw relative to said guide member in a direction substantially parallel to the longitudinal axis of said guide surface and substantially parallel to the longitudinal axis of a hole to be cut in a member.

6. A guide apparatus for guiding movement of a chain saw as defined in claim 5 wherein said guide member is an elongate member having means disposed at one end thereof for affixing said elongate member contiguous to a member to be cut with the longitudinal axis of the elongate member disposed substantially parallel to the axis of the hole to be cut in the member by the chain saw.

7. A guide apparatus for guiding movement of a chain saw as defined in claim 6 wherein said means disposed at one end of said elongate member include a v-shaped bracket having flexible means disposed between the ends of the v-shaped bracket for securing said v-shaped bracket and said elongate member to a member in which it is desired to cut a hole in a position in which said elongate member is disposed substantially parallel to the axis of a hole desired to be cut in the member.

8. A guide apparatus for guiding movement of a chain saw as defined in claim 5 wherein said guide means includes a tubular member having an inner surface which is adapted to engage with the guide surface of said guide member to enable said guide member to move relative to said tubular member only in a direction parallel to the longitudinal axis of the tubular member.

9. A guide apparatus for guiding movement of a chain saw having a bar having a chain guide surface and a pair of parallel planer side surfaces, the guide apparatus being adapted to guide movement of the chain saw in a direction substantially parallel to the longitudinal axis of the bar of the saw through a member disposed contiguous to the guide apparatus comprising a guide member disposable contiguous to a member to be cut and having a guide surface thereof disposed substantially parallel to the axis of a hole to be cut in the member by the chain saw and substantially parallel to the longitudinal axis of the bar of the chain saw, guide means engaging said guide surface, said guide surface guiding relative movement of said guide member and said guide means in a direction substantially parallel to the longitudinal axis of the bar of the chain saw and support means supportable by the chain saw for supporting said guide means in engagement with said guide surface of said guide member to enable said guide member to guide movement of said guide means and the chain saw in a direction parallel to said guide surface to enable the chain saw to cut a hole in a member disposed contiguous to said guide member wherein the hole has an axis substantially parallel to the longitudinal axis of the bar of the chain saw and substantially parallel to said guide surface and wherein said support means pivotably supports said guide means for rotation about an axis disposed substantially (perpendicular) parallel to the pair of planer side surfaces of the bar to enable the chain saw to rotate in a direction substantially perpendicular to said planer side surface of the bar of the saw.

10. A guide apparatus for guiding movement of a chain saw as defined in claim 9 further including stop means secured to said support means for engaging with said guide means to limit rotation of said guide means relative to said support means.

11. A guide apparatus for guiding movement of a chain saw as defined in claim 10 wherein said stop means includes first and second stop members, said first stop member engaging with said guide means to limit rotation of said guide means relative to said support means in a first direction and said second stop member engaging with said guide means to limit rotation of said guide means relative to support means in a second direction opposite said first direction.

12. A guide apparatus for guiding movement of a chain saw as defined in claim 11 wherein said guide means includes a tubular member having an inner surfce which is adapted to engage with the guide surface of said guide member to enable said guide member to move relative to said tubular member only in a direction substantially parallel to the longitudinal axis of said tubular member.

13. A guide apparatus for guiding movement of a chain saw having a bar having a chain guide surface and a pair of parallel planer side surfaces, the guide apparatus being adapted to guide movement of the chain saw in a direction substantially parallel to the longitudinal axis of the bar of the saw through a member in which it is desired to cut a hole comprising a guide means supportable by the saw for guiding movement of the saw in a direction substantially parallel to the longitudinal axis of the bar of the saw, a guide member disposable contiguous to a member to be cut and having a guide surface thereon having a longitudinal axis substantially parallel to the axis of the hole to be cut in the member, said guide means engaging said guide surface of said guide member to guide movement of the saw relative to said guide member in a direction substantially parallel to the longitudinal axis of said guide surface and substantially parallel to the longitudinal axis of the hole to be cut in the member and wherein said guide means is disposed for rotation about an axis disposed substantially parallel to the pair of planer side surfaces of the bar to enable the chain saw to rotate in a direction substantially perpendicular to said planer side surfaces of the bar of the saw.

14. A guide apparatus for guiding movement of a chain saw as defined in claim 13 further including stop means for engaging with said guide means to limit rotation of said guide means about said axis disposed substantially perpendicular to said guide surface.

15. A guide apparatus for guiding movement of a chain saw as defined in claim 14 wherein said stop means includes first and second stop members, said first stop member engaging with said guide means to limit rotation of said guide means relative to the longitudinal axis of the bar of the saw in a first direction and said second stop member engaging with said guide means to limit rotation of said guide means relative to the longitudinal axis of the bar of the saw in a second direction opposite said first direction.

16. A guide apparatus for guiding movement of a chain saw as defined in claim 15 wherein said guide means includes a tubular member having an inner surface which is adapted to engage with the guide surface of said guide member to enable said guide member to move relative to said tubular member only in a direction substantially parallel to the longitudinal axis of said tubular member.

* * * * *